US006985189B1

(12) United States Patent
Takada et al.

(10) Patent No.: US 6,985,189 B1
(45) Date of Patent: Jan. 10, 2006

(54) MULTIMEDIA TERMINAL EQUIPMENT AND DIGITAL PROCESSING METHOD

(75) Inventors: Shinji Takada, Kanagawa (JP); Hajime Inoue, Chiba (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/277,646

(22) Filed: Mar. 26, 1999

(30) Foreign Application Priority Data

Mar. 26, 1998 (JP) ............................... P10-079308

(51) Int. Cl.
*H04N 5/46* (2006.01)
(52) U.S. Cl. ..................................... 348/558; 348/722
(58) Field of Classification Search ............... 348/558, 348/725, 726, 553, 555, 564, 465, 468, 556, 348/407.1, 390.1, 384.1, 388.01, 389.01; 725/139, 141, 151, 153; 375/316, 240.16
See application file for complete search history.

(56) References Cited

U.S. PATENT DOCUMENTS

| | | | | |
|---|---|---|---|---|
| 5,283,653 A | * | 2/1994 | Citta | 348/725 |
| 5,537,157 A | * | 7/1996 | Washino et al. | 348/722 |
| 5,625,416 A | * | 4/1997 | Tseng et al. | 348/388 |
| 5,666,487 A | * | 9/1997 | Goodman et al. | 395/200.76 |
| 5,671,253 A | * | 9/1997 | Stewart | 375/316 |
| 5,717,471 A | * | 2/1998 | Stewart | 348/726 |
| 5,768,539 A | * | 6/1998 | Metz et al. | 395/200.79 |
| 5,796,442 A | * | 8/1998 | Gove et al. | 348/556 |
| 5,847,771 A | * | 12/1998 | Cloutier et al. | 348/564 |
| 5,850,266 A | * | 12/1998 | Gimby | 348/558 |
| 5,867,227 A | * | 2/1999 | Yamaguchi | 348/564 |
| 5,926,229 A | * | 7/1999 | Tsubata et al. | 348/555 |
| 5,940,387 A | * | 8/1999 | Humpleman | 370/352 |
| 5,956,098 A | * | 9/1999 | Mizukami et al. | 348/735 |
| 5,959,659 A | * | 9/1999 | Dokic | 725/152 |
| 5,990,958 A | * | 11/1999 | Bheda et al. | 348/407 |
| 5,999,220 A | * | 12/1999 | Washino | 348/441 |
| 6,005,620 A | * | 12/1999 | Yang et al. | 375/240.28 |
| 6,011,579 A | * | 1/2000 | Newlin | 348/14.08 |
| 6,201,576 B1 | * | 3/2001 | Raghunath et al. | 348/558 |
| 6,337,881 B1 | * | 1/2002 | Chaddha | 375/240.16 |
| 6,370,198 B1 | * | 4/2002 | Washino | 375/240.26 |

\* cited by examiner

*Primary Examiner*—Paulos M. Natnael
(74) *Attorney, Agent, or Firm*—Lerner, David, Littenberg, Krumholz & Mentlik, LLP (57) ABSTRACT

The invention provides a multimedia terminal equipment which can reproduce and output an object broadcasting program irrespective of a providing medium and so forth of the program. The multimedia terminal equipment includes a digital signal processing circuit in the form of a digital signal processor which is programmable to process various kinds of digital broadcasting signals of different formats. A program to be used for processing of an object digital signal is read out from a ROM by a host CPU in response to a selection input from a user and supplied to the digital signal processing circuit. In accordance with the program, the digital signal processing circuit processes a digital signal outputted from a traffic controller in response to the selection input of the user.

28 Claims, 3 Drawing Sheets

MULTIMEDIA TERMINAL EQUIPMENT AND DIGITAL PROCESSING METHOD

CROSS-REFERENCE TO RELATED APPLICATIONS

The present application claims the benefit of Japanese Patent Application Serial No. P10-079308, filed on Mar. 28, 1998, the disclosure of which is incorporated by reference herein.

BACKGROUND OF THE INVENTION

This invention relates to a multimedia terminal equipment and a digital signal processing method which can process broadcasting signals provided by various broadcasts such as, for example, a television broadcast in which a ground wave is used, a satellite broadcast in which a geostationary satellite is used or a cable television broadcast so that the broadcasting signals may be utilized.

In recent years, in addition to an analog television broadcast in which a ground wave is used, a digital television broadcast in which a geostationary satellite is used and a cable television broadcast which provides a television broadcasting program over a cable have become increasingly popular.

For example, in a digital television broadcast in which a geostationary satellite is used, a data compression technique of the MPEG system or the like is used to compress data to produce signals of a plurality of television broadcasting programs, and the signals thus produced are multiplexed on a single carrier so that they can be provided as a television broadcast. In other words, a digital television broadcast allows provision of a plurality of broadcasting programs by one channel. Further, also provision of contents information such as a web page produced in the HTML (Hyper Text Makeup Language) is made possible by a digital television broadcast.

Meanwhile, a cable television broadcasting makes it possible to provide a broadcasting signal stably to the user side because the broadcasting station side and the user side are interconnected over a cable. Also a so-called interactive television broadcast is being put into practical use wherein not only a television broadcast is provided from the broadcasting station side, but also a response from a user can be sent to the broadcasting station side over a cable making use of the advantage that the broadcasting side and the user side are interconnected by the cable.

By the way, in order to make use of a service whose provision has newly become possible by a digital television broadcast in which a geostationary satellite is used or a cable television broadcast described above, it is frequently demanded to receive and make use of the digital television broadcast or cable television broadcast in addition to a conventional analog television broadcast which is based on a ground wave.

However, as described above, for example, in a digital television broadcast in which a geostationary satellite is used, signals of a plurality of broadcasting programs are provided in a form wherein they are, for example, MPEG compressed and multiplexed on one carrier. Therefore, if it is tried to enjoy a digital television broadcast in which a geostationary satellite is used, such processes as to select a carrier on which an object broadcasting program is multiplexed, demodulate the carrier to obtain a transport stream, extract a signal of the object broadcasting program from the transport stream and decompress the extracted signal are required.

On the other hand, also in a cable television broadcast, such processes as to receive a digital broadcasting signal of compressed data supplied over a cable and decompress the received digital broadcasting signal are required.

Therefore, the user must prepare a reception apparatus corresponding to a broadcasting system of a television broadcast to be enjoyed. Accordingly, for example, if it is intended to receive, in addition to a conventional analog broadcast in which a ground wave is used, a digital television broadcast in which a geostationary satellite and a cable television broadcast, then another reception apparatus for the digital television broadcast and a further reception apparatus for the cable television broadcast, are required.

However, to prepare all of reception apparatus corresponding to television broadcasting systems to be enjoyed requires a high cost and imposes a heavy burden upon the user. Further, in this instance, the user must selectively use the plurality of reception apparatus in accordance with the broadcasting system of a television broadcasting program to be enjoyed, and this is complicated and cumbersome to the user.

SUMMARY OF THE INVENTION

It is an object of the present invention to provide a multimedia terminal equipment which can reproduce and output an object broadcasting program irrespective of a broadcasting system and so forth of the program.

In order to attain the object described above, according to the present invention, there is provided a multimedia terminal equipment, comprising a digital signal processing circuit capable of selectively using a program in accordance with contents of processing to be performed for an input digital signal, and control means for supplying a program to be used for processing of an object digital signal from within a plurality of different digital signals whose processing or decoding methods are different from each other to the digital signal processing circuit.

In the multimedia terminal equipment, the digital signal processing circuit can receive supply of various kinds of digital broadcasting signals provided by, for example, a digital broadcast which is broadcast using a ground wave, a digital satellite broadcast and a digital cable television broadcast and can process the received signals. To the digital signal processing circuit, a program to be used for processing of a digital signal inputted to the digital signal processing circuit is supplied from the controlled means.

Consequently, the digital signal processing circuit can process the digital signal inputted thereto appropriately using the program supplied from the control means.

The multimedia terminal equipment may be constructed such that it further comprises one input terminal for accepting inputs of various kinds of digital signals whose processing or decoding methods are different from each other, and storage means for storing a program to be used for processing of the digital signal inputted through the input terminal, the control means transferring the program stored in the storage means to the digital signal processing circuit.

In the multimedia terminal equipment, a digital signal inputted through the input terminal is supplied to the digital signal processing circuit, and a program to be used for processing of the digital signal is acquired from the storage means by the control means and is transferred to the digital signal processing circuit.

Consequently, the digital signal inputted through the input terminal can be processed appropriately by the digital signal processing circuit based on the program stored in the storage means.

The multimedia terminal equipment may be constructed such that it further comprises one input terminal for accepting inputs of various digital signals whose processing or decoding methods are different from each other, recognition means for recognizing a type of the digital signal inputted through the input terminal, and storage means for storing a plurality of programs to be used for processing of the digital signals which may be inputted through the input terminal and whose processing or decoding methods are different from each other, the control means being operable to extract, from the storage means, one of the programs to be used for processing of the digital signal inputted through the input terminal and recognized by the recognition means and transfer the program to the digital signal processing circuit.

In the multimedia terminal equipment, various kinds of digital signals whose processing or decoding methods are different from each other can be inputted through the one input terminal. The kind of a digital signal inputted through the input terminal is recognized by the recognition means.

Then, one of the programs to be used for processing of the digital signal inputted through the input terminal is extracted based on a result of the recognition of the recognition means by the control means and transferred to the digital signal processing circuit.

Consequently, various kinds of digital signals whose processing or decoding methods are different from each other can be processed by the multimedia terminal equipment.

The multimedia terminal equipment may be constructed such that it further comprises a plurality of input terminals for individually accepting inputs of various kinds of digital signals whose processing or decoding methods are different from each other, recognition means for recognizing kinds of input digital signals to be individually inputted through the plurality of input terminals, signal selection means for receiving the input digital signals through the plurality of input terminals and selecting one of the digital signals which is to be supplied to the digital signal processing circuit, and program storage means for storing a plurality of programs to be used individually for processing of the input digital signals to be inputted through the plurality of input terminals, the control means being operable to control the signal selection means to select one of the input digital signals individually inputted through the plurality of input terminals and recognized by the recognition means in accordance with a selection instruction of a user based on the kinds of the input digital signals and supply one of the programs to be used for processing of the selected input digital signal in accordance with the selection instruction from the program storage means to the digital signal processing circuit.

In the multimedia terminal equipment, the plurality of input terminals for individually accepting inputs of different digital signals whose processing or decoding methods are different from each other are provided, and digital signals inputted through the input terminals are supplied to the signal selection means. In this instance, the kinds of the digital signals which are inputted through the plurality of input terminals and whose processing or decoding methods are different from each other are recognized in advance by the recognition means.

Then, the signal selection means is controlled by the control means based on the kinds of the digital signals inputted through the plurality of input terminals and recognized by the recognition means so that one of the digital signals conforming to a selection instruction of a user may be supplied to the digital signal processing circuit. Further, one of the programs to be used for processing of the digital signal in accordance with the selection instruction of the user is extracted from the program storage means by the control means and supplied to the digital signal processing circuit.

Consequently, the multimedia terminal equipment can receive supply of a plurality of digital broadcasting signals whose processing or decoding methods are different from each other and select and process an object one of the digital broadcasting signals.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

In the following, a multimedia terminal equipment according to a preferred embodiment of the present invention is described with reference to the drawings. The multimedia terminal equipment described below is constructed so as to receive and process signals supplied from a plurality of different networks such as an analog broadcast in which a ground wave is used, a digital television broadcast in which a ground wave is used, a digital satellite broadcast and a digital cable television broadcast so that the signals may be utilized.

Figure 1:
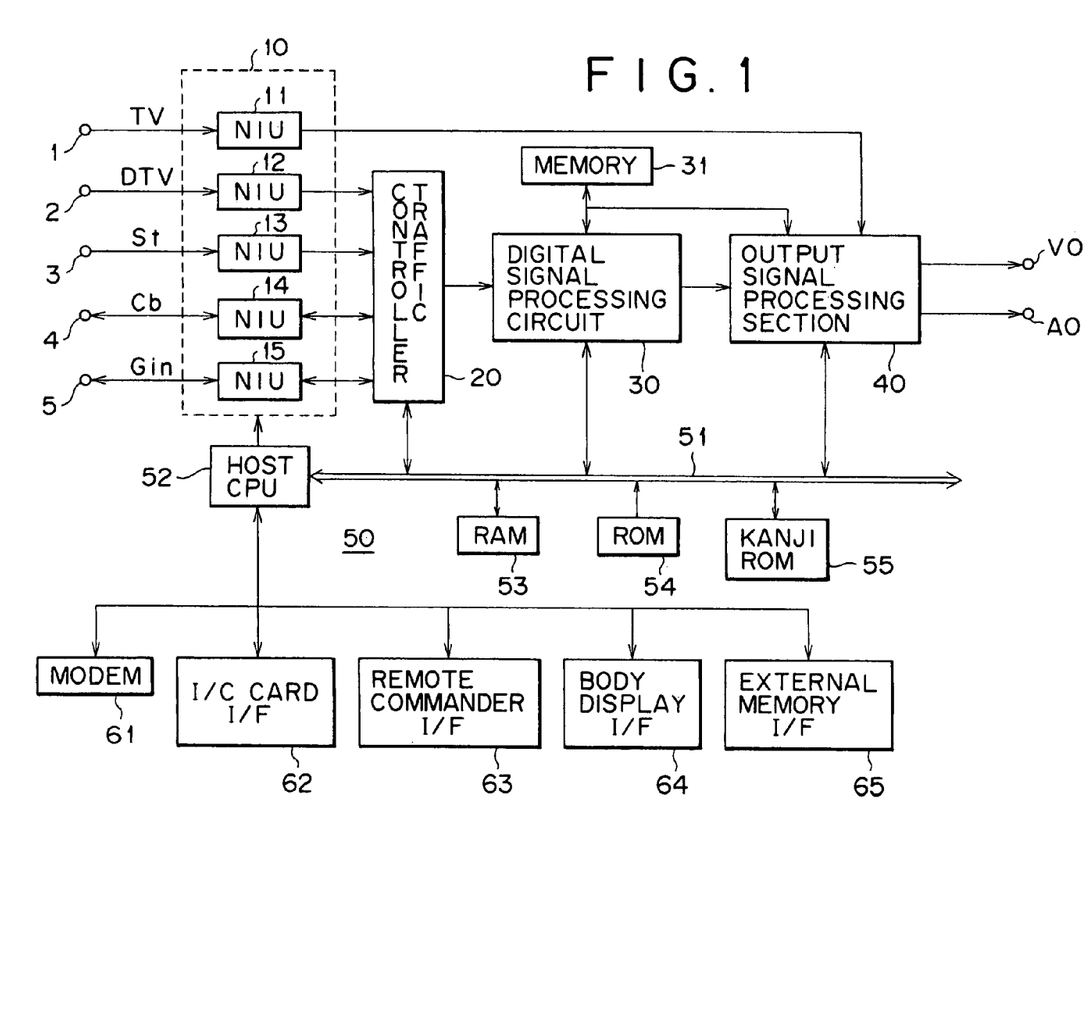
FIG. 1 is a block diagram showing a multimedia terminal equipment according to a preferred embodiment of the present invention.

FIG. 1 shows a multimedia terminal equipment according to a preferred embodiment of the present invention. Referring to FIG. 1, the multimedia terminal equipment shown includes a terminal 1 for accepting an input of an analog television broadcasting signal, terminals 2 to 5 for accepting inputs of digital television broadcasting signals and so forth, a network interface unit section 10 including network interface units (NIU) 11 to 15 corresponding to the terminals 1 to 5, a traffic controller 20, a digital signal processing circuit 30, an output signal processing section 40, a video signal output terminal VO for a video signal, an audio signal output terminal AO for an audio signal, and a control section 50.

The control section 50 is a microcomputer to which a host CPU (central processing unit) 52, a RAM 53, a ROM 54 and a kanji ROM 55 are connected by a bus 51, and controls the components of the multimedia terminal equipment. The RAM 53 is used as a working area in various processes executed by the control section 50. The ROM 54 stores in advance therein processing programs to be executed by the control section 50, processing programs for signal processes to be executed by the digital signal processing circuit 30 which will be hereinafter described and so forth, data to be used in various kinds of processes and so forth. The kanji ROM 55 stores in advance therein font data of characters, symbols and so forth to be used for display such as kanji font data.

Connected to the control section 50 are a modem 61, an IC card interface (I/F) 62, a remote commander interface (I/F) 63 for interfacing with a remote commander not shown, a body display interface (I/F) 64 for interfacing with a fluorescent display tube (not shown) provided on the body (not shown) of the multimedia terminal equipment, and an external memory interface (I/F) 65 for interfacing with an external memory (not shown).

In the multimedia terminal equipment of the present embodiment, an interface of the modem 61, the IC card interface 62, the remote commander interface 63, the body display interface 64 and the external memory interface 65 are constructed as a so-called gate array and formed in a single LSI. Since the plurality of different interfaces are constructed as a so-called gate array in this manner, they can be incorporated at a low cost in the reception apparatus of the multimedia terminal equipment of the present embodiment.

It is to be noted that the IC card interface 62 is provided for connection to the multimedia terminal equipment of an IC card or a like device which is given, for example, when a digital satellite broadcast is a chargeable broadcast, to the user of the multimedia terminal equipment when the user makes a contract with a broadcasting company which provides the digital satellite broadcast. The IC card has individual information of the user such as contract terms and is required to descramble the digital satellite broadcast provided to the multimedia terminal equipment. The individual information of the IC card such as contract terms can be re-written by communication with an accounting center of the broadcasting company side through the modem 61 or by some other suitable means.

In the multimedia terminal equipment of the present embodiment, the terminal 1 accepts an input of an analog television broadcasting signal TV which is provided using a ground wave. Meanwhile, the terminals 2 to 5 individually accept inputs of digital signals. Here, digital signals whose formats are different from one another because the providing route such as a network through which a digital signal is provided is different among them, are supplied individually to the terminals 2 to 5.

More particularly, in the multimedia terminal equipment of the present embodiment, the input terminal 2 accepts an input of the digital television broadcasting signal DTV which is provided using a ground wave. The input terminal 3 accepts an input of the digital broadcasting signal St which is provided using a geostationary satellite. The input/output terminal 4 accepts an input of the digital broadcasting signal Cb of a cable television broadcast provided over a cable. The input/output terminal 4 is used also for transmission of digital data from the multimedia terminal equipment of the present embodiment over the cable.

Further, the input/output terminal 5 is an input/output terminal of the IEEE 1394 standards which are interface standards prescribed by the IEEE (Institute of Electrical and Electronics Engineers). Through the input/output terminal 5, digital data can be inputted to or outputted from the multimedia terminal equipment of the present embodiment to or from a digital apparatus such as a DVTR (digital video tape recorder) or a hard disk unit (AVHDD unit) which allows recording and playing back of a digital video signal and a digital audio signal.

The network interface units 11 to 15 perform processes for accepting signals inputted through the terminals 1 to 5, respectively, into the multimedia terminal equipment of the present embodiment. Further, the network interface units 14 and 15 perform also adjustment of digital data to be outputted from the multimedia terminal equipment of the present embodiment.

More particularly, the network interface units 11 to 13 perform such processes as to select a broadcasting signal from among broadcasting signals inputted thereto in accordance with an instruction of the user and demodulate the selected broadcasting signal under the control of the control section 50. In other words, the network interface units 11 to 13 have functions of a tuner section, a demodulation section and so forth. Meanwhile, the network interface unit 14 performs such processes as to select a broadcasting signal from among broadcasting signals inputted thereto and demodulate the selected broadcasting signal and further performs such processes as to convert digital data, which are to be transmitted from the multimedia terminal equipment over the cable connected to the same, into data of a format to be transmitted under the control of the control section 50 in accordance with an instruction of the user.

The network interface unit 15 performs, in the multimedia terminal equipment of the present embodiment, such processes as to convert a signal, supplied from an external digital apparatus such as a digital video tape recorder through an interface of the IEEE 1394 standards, into a digital signal of a format which can be processed by the multimedia terminal equipment or convert digital data to be outputted from the multimedia terminal equipment into digital data of a format which can be outputted through the interface of the IEEE 1394 standards.

The traffic controller 20 selects a digital signal to be supplied to the digital signal processing circuit 30 from among digital data supplied thereto from the network interface units 12 to 15 under the control of the control section 50 in accordance with an instruction from the user. Further, the traffic controller 20 supplies a digital broadcasting signal from the network interface unit 12 to the network interface unit 15 to select a route for a digital signal to be outputted through the interface of the IEEE 1394 standards or the like. Furthermore, the traffic controller 20 performs, for example, selection of a route for a digital signal such as a route for outputting, through the network interface unit 14 and the input/output terminal 4, charging information read out from the IC card through the IC card interface 62.

In short, in the multimedia terminal equipment of the present embodiment, it is determined in advance which digital signals are to be outputted individually from the terminals 2 to 5. Accordingly, it also is determined which digital signal is outputted from each network interface unit, and the control section 50 recognizes individual types of digital signals to be supplied from the network interface units 12 to 15.

Consequently, in the multimedia terminal equipment of the present embodiment, the control section 50 controls the traffic controller 20 based on the type of a digital signal from any of the network interface units 12 to 15 recognized by the control section 50 and an instruction input from the user.

In particular, if the user operates, for example, the remote commander not shown to select an object digital broadcasting signal to be enjoyed, then a remote control signal corresponding to the operation is outputted from the remote commander. The remote control signal is fetched into the control section 50 of the multimedia terminal equipment through the remote commander interface 63 connected to the control section 50 of the multimedia terminal equipment.

Then, the control section 50 forms a control signal to be supplied to the traffic controller 20 based on the instruction input information from the user provided by the remote control signal and the above-described types of the digital signals recognized by the control section 50 and supplied from the network interface units 12 to 15, and supplies the control signal to the traffic controller 20.

The traffic controller 20 selects a signal to be supplied from the traffic controller 20 based on the control signal from the control section 50. Consequently, the digital signal based on the instruction from the user is supplied from the traffic controller 20 to the digital signal processing circuit 30.

The digital signal processing circuit 30 is a DSP (digital signal processor) and can apply a different processing program in response to a digital signal whose processing or decoding method is different. In the multimedia terminal equipment of the present embodiment, a plurality of different programs to be executed by the digital signal processing circuit 30 to process digital signals whose processing or decoding methods are different from one another are stored in the ROM 54 of the control section 50. The digital signal processing circuit 30 executes the program supplied thereto from the control section 50 to process the digital signal supplied hereto from the traffic controller 20.

In short, the multimedia terminal equipment of the present embodiment can accept a supply of a digital broadcasting signal supplied by a digital television broadcast in which a ground wave is used or a digital satellite broadcast in which a geostationary satellite is used, a digital broadcasting signal provided by a cable television broadcast or a digital signal from an external digital apparatus such as a digital video tape recorder as described hereinabove.

The digital signals mentioned are different in terms of the format such as a construction of data or an applied data compression system. Consequently, programs to be used for processing of the different types of digital signals having different formats are prepared in advance in the ROM 54 of the control section 50. Then, if a digital signal is selected by the user as described above, then the control section 50 supplies a control signal to the traffic controller 20 to indicate a digital signal to be outputted to the digital signal processing circuit 30, and reads out a program to be used for processing of the selected digital signal from the ROM 54 and supplies the program to the digital signal processing circuit 30.

The digital signal processing circuit 30 executes the program received from the control section 50 and makes preparations for processing of the digital signal supplied thereto from the traffic controller 20. Then, the digital signal processing circuit 30 processes the digital signal from the traffic controller 20 to form a signal to be outputted.

In the following, processing of the digital signal processing circuit 30 is described taking a case wherein a digital broadcasting signal including a plurality of television broadcasting programs multiplexed on a single carrier and provided by a digital television broadcast in which a geostationary satellite is used as an example.

After an object digital television broadcast provided using a geostationary satellite is selected by the user, a transport stream selected and demodulated by the network interface unit 13 is supplied through the traffic controller 20 to the digital signal processing circuit 30.

Figure 2:
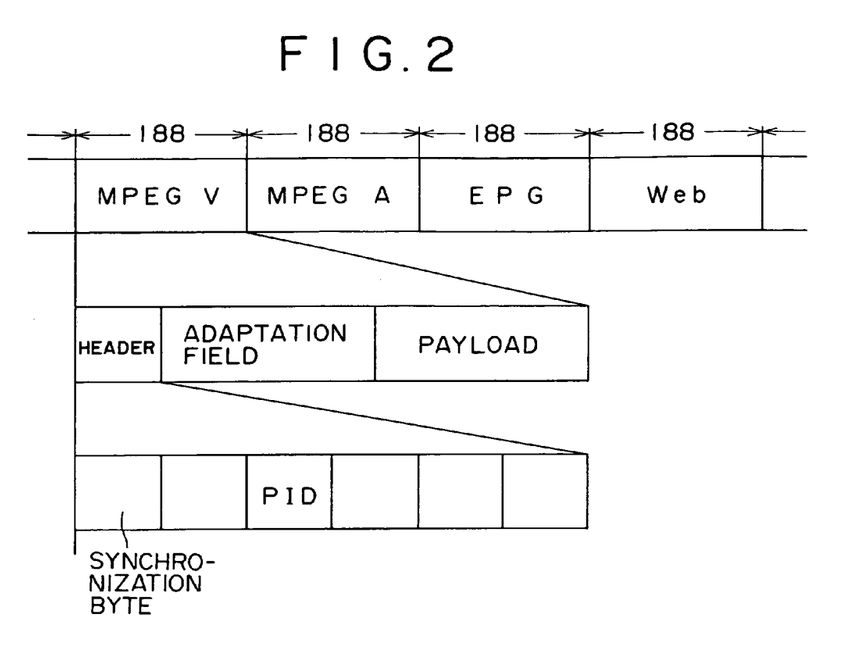
FIG. 2 is a diagram illustrating a transport stream provided by a digital satellite broadcast which is one of digital broadcasting signals which can be processed by the multimedia terminal equipment shown in FIG. 1.

FIG. 2 illustrates a construction of a transport stream supplied to the digital signal processing circuit 30 and including multiple programs multiplexed therein. As shown in FIG. 2, a transport stream is a bit stream defined by the MPEG system and is a set of packets (transport packets) of a fixed length of 188 bytes.

Each of the transport packets includes a header, an adaptation field for placing additional information into a particular individual packet, and a payload representing contents of the packet. In the payload, various data of an MPEG compressed digital video signal (MPEG V), an MPEG compressed digital audio signal (MPEG A), or a web page produced, for example, in the HTML (denoted as Web in FIG. 2) or a game program selected and utilized by the user, are stored.

Also a transport packet in which data to be used for selection of a channel, data of a scramble key necessary for limited reception or service information data for realization of an EPG (Electronic Program Guide) are multiplexed together with a transport packet in which program (broadcasting program) data are placed. In short, a transport stream is a multiplexed stream of packets of data of a plurality of programs (broadcasting programs) and packets of data regarding program selection, limited reception and service information data and so forth.

The header of each transport packet is composed of 4 bytes and includes a synchronization byte at the top thereof. The header has, in addition to the synchronization byte, a packet ID (PID) which is identification information of the packet, control information such as whether or not scrambling is involved, whether or not there is a succeeding adaptation field or payload, and so forth placed therein.

In order to extract and process a packet of the object television broadcasting program from the transport stream having such a construction as described above, the digital signal processing circuit 30 executes the program received from the control section 50 to extract data of the object television broadcasting program from the transport stream and decompress the extracted data, and supplies the decompressed signal of the broadcasting program to the output signal processing section 40.

Further, the digital signal processing circuit 30 extracts EPG data included in the transport stream for displaying an EPG (electronic program guide) and forms data to be used to display the EPG.

Figure 3:
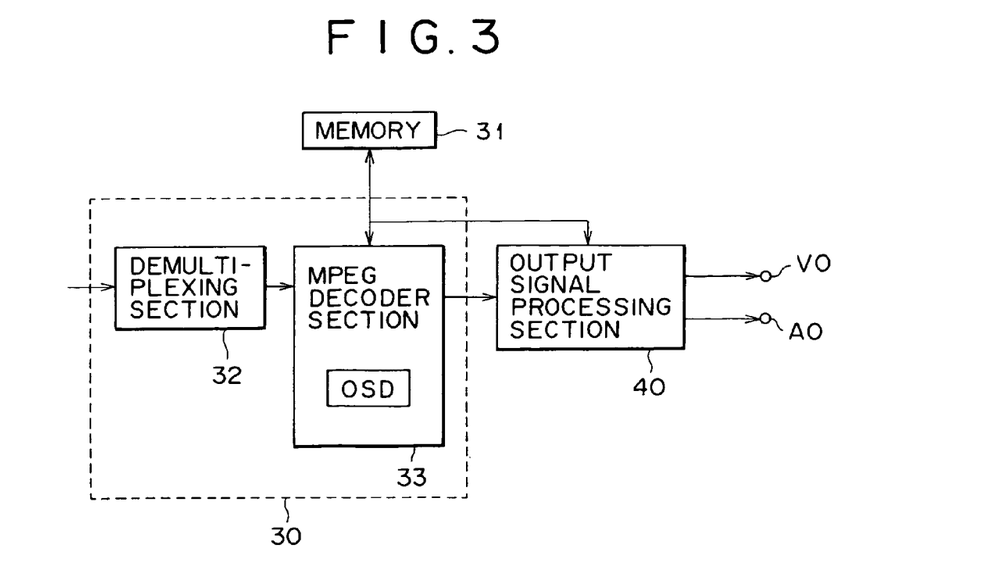
FIG. 3 is a block diagram showing a digital signal processing circuit constructed in accordance with a program from a control section of the multimedia terminal equipment shown in FIG. 1 for processing the transport stream illustrated in FIG. 2.

In short, in the multimedia terminal equipment of the present embodiment, when a program to be used for processing of a transport stream is supplied from the control section 50, the digital signal processing circuit 30 constructs a signal processing circuit as shown in FIG. 3 in response to the thus supplied program.

FIG. 3 conceptually illustrates a process which is performed by the digital signal processing circuit 30 when it executes a program to be used for processing of a transport stream. When the program to be used for processing of a transport stream is executed, the digital signal processing circuit 30 forms a demultiplexing section 32 for extracting data of an object broadcasting program from a transport stream, and an MPEG decoder section 33.

The thus constructed demultiplexing section 32 demultiplexes and extracts, based on a PID added to the header of each transport packet, various kinds of data such as an MPEG compressed video signal or audio signal of a program (broadcasting program) in response to program selection of the user, EPG data for displaying an EPG (electronic program guide) or data regarding program selection or limited reception.

Then, the video signal, audio signal or EPG data of the program (broadcasting program) corresponding to the program selection of the user is supplied to the MPEG decoder section 33 which is constructed by executing the program. The other data regarding program selection or limited reception is supplied to the control section 50 and used for control of the program (broadcasting program) selection or limited reception.

Further, as described hereinabove, the digital television broadcast provides also provision information such as a web page or a game program produced in a predetermined language such as the HTML in a multiplexed condition together with the video signal, audio signal, EPG data or the like of the program (broadcasting program). If utilization of such provision information to be utilized by the user other than the signals of the television broadcasting program is indicated by the user, then in the digital signal processing circuit 30 of the multimedia terminal equipment of the present embodiment, the provision information is extracted from the transport stream by the demultiplexing section 32. The thus extracted data is supplied to the control section 50, in which it is temporarily stored into the RAM 53 so that it can be analyzed and utilized by the control section 50 later.

It is to be noted that the demultiplexing section 32 performs also reproduction of a program clock reference to be used as a reference for synchronous playing back of the video signal and the audio signal based on synchronization bits included in the transport stream.

The EPG data is temporarily stored into a memory 31 which is used as a working area in processing of the digital signal processing circuit, and then is supplied to the control section 50. Then, an OSD function provided for the MPEG decoder section 33 which will be hereinafter described is used to display an EPG under the control of the control section 50.

The MPEG decoder section 33 performs decompression processing, that is, MPEG decoding processing, of the digital video signal and the digital audio signal of the MPEG compressed program (broadcasting program) demultiplexed and extracted by the demultiplexing section 32. Then, the decompressed digital video signal and digital audio signal are supplied to the output signal processing section 40.

In the various processes performed by the digital signal processing circuit 30, the memory 31 is used as a working area. In particular, the memory 31 is used as a working area upon decompression as well as a working area for various kinds of processes performed by the digital signal processing circuit 30 such as temporary storage of EPG data.

The MPEG decoder section 33 further has an OSD (on-screen display) processing function and can perform such processing as to display an EPG or a menu based on the extracted EPG data, for example, in a superposing relationship with an image of the program (broadcasting program) under the control of the control section 50.

Then, the output signal processing section 40 forms an analog output video signal from the digital video signal supplied thereto and supplies the analog output signal to a monitor receiver through the video signal output terminal VO so that an image of the object broadcasting program may be displayed on the display screen of the monitor receiver.

Meanwhile, also the digital audio signal is converted into an analog output signal by the output signal processing section 40 and then supplied, for example, to the monitor receiver through the audio signal output terminal AO so that sound may be outputted from a speaker of the monitor receiver.

In this manner, in the multimedia terminal equipment of the present embodiment, contents of processing to be executed by the digital signal processing circuit 30 can be varied in response to a digital signal to be processed based on a program to be used for processing of a digital signal from the control section 50.

Although a case wherein a digital satellite broadcast which is provided in the form of a signal in which a plurality of television broadcasting signals are multiplexed on one carrier is received and selected in order to enjoy an object broadcasting program is described above, also where it is intended to play back and enjoy a digital video signal and a digital audio signal from a digital television broadcast in which a ground wave is used or a cable television broadcast or else from an external digital apparatus, the digital signal processing circuit can execute, in accordance with a program to be used for processing of a digital signal selected by the user, processing conforming to a format of the selected digital signal, for example, demultiplexing processing and decoding processing of the digital video signal and the digital audio signal.

For example, different digital television broadcasts are sometimes different in resolution of an image. For example, it is considered that digital broadcasts having resolutions of 1080 i, 480 i and 480 p may possibly be provided.

Also in such an instance, the digital signal processing circuit 30 can process, based on a program from the control section 50, a digital video signal of any of the resolutions in accordance with the resolution of the digital signal. Then, the output signal processing section 40 can perform processing suitable for each resolution of the digital video signal under the control of the control section 50 and provide resulting data to the monitor receiver.

Further, the multimedia terminal equipment of the present embodiment can not only receive a supply of a digital broadcast but also receive an analog television broadcast through the terminal 1. Since a signal of an analog television broadcast does not require such processing as is required for a digital broadcasting signal described above, it is selected and demodulated by the network interface unit 11. Then, the analog television broadcasting signal is processed by predetermined processing by the output signal processing section 40, and a resulting video signal and audio signal are outputted through the output terminals VO and AO, respectively.

Subsequently, processing performed by the multimedia terminal equipment of the present embodiment shown in FIG. 1 in response to a digital broadcasting signal to be enjoyed is described with reference to a flow chart of FIG. 4. In the multimedia terminal equipment of the present embodiment, the type of a broadcasting signal to be enjoyed (such as a providing medium or a broadcasting type), a broadcasting signal (channel) to be enjoyed and, where a plurality of broadcasting programs are multiplexed on one carrier, a broadcasting program to be enjoyed, can be designated by operating the remote controller of the multimedia terminal equipment.

In particular, the multimedia terminal equipment of the present embodiment can select the analog television broadcasting signal TV, the digital television broadcasting signal DTV, the digital broadcasting signal St, the digital broadcasting signal Cb or the digital signal Gin from an external digital apparatus and can selectively designate a broadcasting signal and a broadcasting program to be enjoyed by means of the remote commander.

Figure 4:
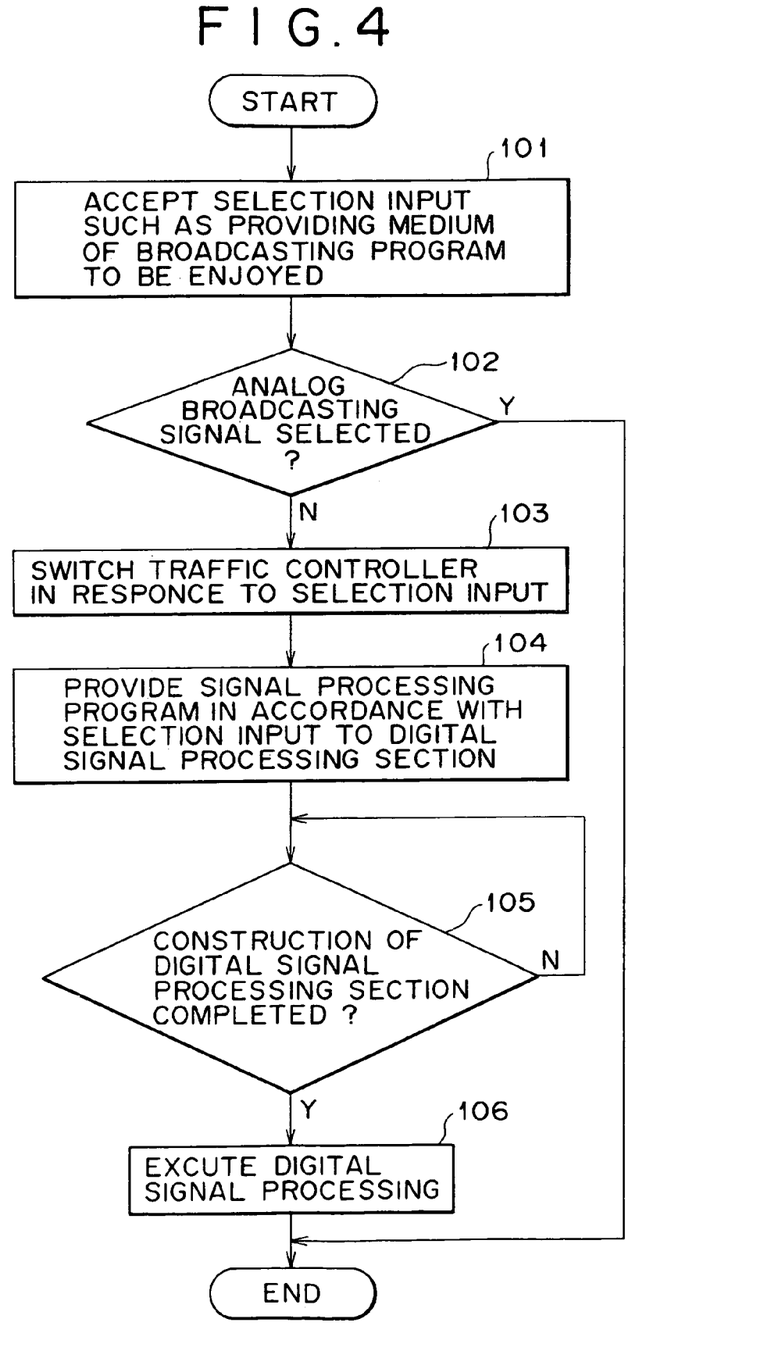
FIG. 4 is a flow chart illustrating signal processing executed by the multimedia terminal equipment shown in FIG. 1.

To this end, the multimedia terminal equipment of the present embodiment can execute the processing illustrated in FIG. 4 every interval of time determined in advance after the power supply is made available to the multimedia terminal equipment of the present embodiment, to suitably accept a selection input from the user.

After execution of the processing illustrated in FIG. 4 is started, the control section 50 accepts a selection input of a providing medium or the like to be enjoyed from the user such as an analog television broadcasting signal TV, a digital television broadcasting signal DTV, a digital broadcasting signal St, a digital broadcasting signal Cb or a digital signal Gin from an external digital apparatus (step 101).

Then, the control section 50 discriminates whether or not the selection input from the user designates selection of an analog television broadcast (step 102). If the control section 50 discriminates that an analog broadcasting signal is selected, in the multimedia terminal equipment of the present embodiment, the control section 50 controls so that a digital signal from the traffic controller 20 may be stopped from being supplied to the traffic controller 20, and ends the processing illustrated in FIG. 4. Consequently, a broadcasting program provided by the selected analog television broadcast is played back and outputted.

If the control section 50 discriminates in the discrimination processing in step 102 that the selection input from the user does not indicate selection of an analog television broadcast, the control section 50 switches the traffic controller 20 in response to the selection input accepted in step 101 (step 103).

Then, the control section 50 reads out a signal processing program corresponding to the selection input from the user from the ROM 54 and supplies the signal processing program to the digital signal processing circuit 30 (step 104).

Then, the control section 50 waits for completion of construction for processing of a digital signal corresponding to the selection input from the user by the digital signal processing circuit 30 in accordance with the program from the control section 50 (step 105). After completion of the construction, the digital signal processing circuit 30 executes processing for a digital signal in accordance with the selection input of the user (step 106).

Consequently, signal processing for the digital signal in accordance with the selection input of the user is performed by the digital signal processing circuit 30, and an object digital signal intended by the user is played back and outputted from the multimedia terminal equipment so that it may be enjoyed through a monitor receiver or a like apparatus.

In this manner, the multimedia terminal equipment receives supplies of a plurality of digital signals having different formats, performs playing back processing of each of the digital signals in response to the format of the digital signal and outputs a resulting signal.

Consequently, the multimedia terminal equipment of the present embodiment can process and utilize digital signals provided by different types of digital broadcasts having different formats without preparing reception apparatus for the individual digital broadcasts.

Further, since a CPU which is the same as a host CPU employed in various kinds of receiving apparatus for different digital broadcasts can be used for the host CPU 52 of the multimedia terminal equipment, application programs which are conventionally used in receiving apparatus for various kinds of digital broadcasts can be used as they are in the present multimedia terminal equipment.

It is to be noted that, while, in the embodiment described above, a program to be used for processing of an object digital signal to be supplied to the digital signal processing circuit 30 is prepared in advance in the ROM 54, it need not necessarily be prepared in this manner.

For example, it is otherwise possible to store, into an external memory connected to the external memory interface 65, programs to be executed by the digital signal processing circuit 30, read out a program to be used for processing of an object digital signal from the external memory and supply the thus read out program to the digital signal processing circuit 30.

In this instance, for example, even when a digital broadcasting signal of a new format begins to be provided, the multimedia terminal equipment can be modified so as to receive and process the digital broadcasting signal. In this instance, for example, the multimedia terminal equipment should be constructed such that it receives a supply of a digital signal through a predetermined terminal such as the input/output terminal 5 from an external digital apparatus, selects the program corresponding to the format of the digital signal, reads out the selected program from the external memory and supplies the read out program to the digital signal processing circuit 30. The construction just described can be achieved by adding or modifying the program to be executed by the control section 50.

Further, as described above, the multimedia terminal equipment can receive a supply not only of a digital broadcasting signal but also of, for example, a digital video signal and a digital audio signal from a digital video tape recorder, a digital video signal and a digital audio signal produced using a personal computer or a like apparatus and recorded in an AVHDD unit or like signals, performs, by the digital signal processing circuit thereof, processing of any of the signals in accordance with the format of the signal to play back the signal and output the played-back signal.

The multimedia terminal equipment of the embodiment described above is constructed such that, even if it simultaneously receives inputs of an analog broadcasting signal by an analog television broadcast, digital broadcasting signals of three different digital broadcasts and a digital signal from an external digital apparatus, it selects one of the signals in response to a selection input of the user and processes and outputs the selected signal.

However, where only one digital television broadcast is available, it is useless to provide a plurality of input terminals for different digital signals in advance. Therefore, the multimedia terminal equipment should be modified such that it has, as an input terminal for a digital signal, only one input terminal and the digital signal inputted from the input terminal is supplied to the digital signal processing circuit. Then, a program to be used for processing of the digital signal which is known to be inputted from the input terminal is supplied to the digital signal processing circuit so that only the object digital signal may be processed.

Further, also where the multimedia terminal equipment is modified such that it has a single input terminal for a digital signal, it may be expected that a plurality of different kinds of digital signals become objects as a digital broadcasting signal provided by a cable television broadcast becomes newly available. In this instance, if the multimedia terminal equipment is further modified such that a program to be used for processing of the digital signal which has newly become available, is additionally stored into the memory for storing programs to be supplied to the digital signal processing circuit and the user selects one of the programs to be supplied to the digital signal processing circuit, then it can process the plurality of digital signals whose processing or decoding methods are different from each other.

It is otherwise possible to prepare an external memory in which a program to be used for processing of a digital signal whose processing or decoding method is different is stored and connect the external memory to an external memory interface such as, for example, the remote commander interface 63 of the multimedia terminal equipment shown in FIG. 1 so that the digital signal which has newly become available can be processed.

In other words, a plurality of digital signals whose processing or decoding methods are different from each other can be processed by preparing a plurality of external memories in advance in which programs to be used for processing of the digital signals whose processing or decoding methods are different from each other, are stored individually. Naturally, it is otherwise possible to prepare an external memory in which a plurality of programs to be used for processing of a plurality of digital signals whose processing or decoding methods are different from each other are stored and select one of the programs to be used.

Further, for example, where an input terminal of the IEEE 1394 standards described hereinabove is involved, when an interface cable is connected to the input terminal, the multimedia terminal equipment can discriminate what external digital apparatus is connected thereto by the interface cable from a signal communicated through the interface of the IEEE 1394 standards.

Where the interface cable is connected to the input terminal in this manner, the multimedia terminal equipment can be constructed such that it can recognize, for example, based on a signal inputted thereto, a type of the digital signal inputted. In this instance, a plurality of digital signal processing programs to be used for processing of a plurality of kinds of digital signals which can be inputted to the multimedia terminal equipment and for which different processing or decoding methods from each other are required are stored in advance in the ROM of the control section.

Then, when the interface cable is connected to the input terminal, the multimedia terminal equipment can discriminate the type of a digital signal inputted through the input terminal, extract a program corresponding to the discriminated digital signal from the ROM and supply the program to the digital signal processing circuit. In this instance, the multimedia terminal equipment can receive a plurality of kinds of digital signals through the single input terminal. Further, similarly as where an interface of the IEEE 1394 standards is involved, the multimedia terminal equipment can recognize the type of a digital signal only by connecting the interface cable to the input terminal, and consequently, it is not necessary for the user to perform inputting processing such as to select a type of a digital signal to be processed.

While a preferred embodiment of the present invention has been described using specific terms, such description is for illustrative purposes only, and it is to be understood that changes and variations may be made without departing from the spirit or scope of the following claims.

What is claimed is:

1. A multimedia terminal comprising:
a plurality of interfaces, each of said interfaces being adapted to receive one of a plurality of differently compressed digital video signals transmitted from one of a plurality of different transmission systems and to transmit said one compressed digital video signal, each of said digital video signals being compressed in a different format and decompressible using one of a plurality of different decompression programs;
a controller adapted to receive said compressed digital video signals from said interfaces and to transmit a selected one of said compressed digital video signals;
a memory for storing said plurality of decompression programs;
a first processor adapted to receive said selected compressed digital video signal from said controller, receive a selected one of said decompression programs from said memory in response to the selection of said selected compressed digital video signal, said selected decompression program being adapted to decompress digital video signals in the compression format of said selected compressed digital video signal, and to run said selected decompression program to decompress said selected compressed digital video signal for display on a display apparatus; and
a second processor adapted to identify the compression format of said selected compressed digital video signal, cause said controller to transmit said selected one of said compressed digital video signals and cause said selected one of said decompression programs to be transmitted from said memory to said first processor.

2. A multimedia terminal as in claim 1, further comprising a user interface adapted to receive a signal from a user for choosing said selected compressed digital video signal for display on said display apparatus.

3. A multimedia terminal as in claim 2, wherein said signal from said user is transmitted from a remote control device.

4. A multimedia terminal as in claim 1, further comprising a third processor adapted to receive an output signal from said first processor and convert said output signal to an analog video output signal for display on said display apparatus.

5. A multimedia terminal as in claim 1, wherein said plurality of different transmission systems comprises a satellite television broadcasting system and a cable television broadcasting system.

6. A multimedia terminal as in claim 5, wherein said plurality of different transmission systems further comprises a terrestrial television broadcasting system.

7. A multimedia terminal as in claim 1, wherein said plurality of different transmission systems comprises a digital video playback system associated with said multimedia terminal.

8. A multimedia terminal as in claim 7, wherein at least one of said interfaces is adapted to receive digital video signals formatted in accordance with the IEEE 1394 standard and said digital video playback system communicates with said multimedia terminal through said one interface.

9. A multimedia terminal as in claim 1, wherein said plurality of different transmission systems comprises a digital video playback system associated with said multimedia terminal, said playback system being of a particular type, and said second processor is further adapted to identify said particular type and to cause said selected one of said decompression programs to be transmitted from said memory to said first processor on the basis of said type.

10. A multimedia terminal as in claim 1, wherein said differently compressed digital video signals include a digital video signal compressed in accordance with the MPEG standard.

11. A multimedia terminal as in claim 10, wherein said differently compressed digital video signals include HTML data.

12. A multimedia terminal as in claim 1, wherein each of said differently compressed digital video signals is modulated on one of a plurality of different carriers and said interfaces demodulate said digital video signals from said carriers.

13. A multimedia terminal as in claim 1, wherein said differently compressed digital video signals are formatted in different image resolutions.

14. A multimedia terminal as in claim 1, wherein said memory is removably mounted on said multimedia terminal.

15. A method of processing digital video signals on a multimedia terminal comprising:
   receiving at each of a plurality of interfaces of said multimedia terminal one of a plurality of differently compressed digital video signals transmitted from one of a plurality of different transmission systems, each of said digital video signals being compressed in a different format and decompressible using one of a plurality of different decompression programs;
   receiving at a controller said compressed digital video signals transmitted from said interfaces;
   transmitting from said controller a selected one of said compressed digital video signals;
   storing in a memory a plurality of decompression programs;
   receiving at a first processor said selected compressed digital video signal from said controller and a selected one of said decompression programs from said memory in response to the selection of said selected compressed digital video signal, said selected decompression program being adapted to decompress digital video signals in the compression format of said selected compressed digital video signal;
   running said selected decompression program on said first processor to decompress said selected compressed digital video signal for display on a display apparatus;
   identifying with a second processor the compression format of said selected compressed digital video signal;
   causing with said second processor said controller to transmit said selected one of said compressed digital video signals; and
   causing with said second processor said selected one of said decompression programs to be transmitted from said memory to said first processor.

16. A method as in claim 15, further comprising receiving at a user interface a signal from a user for choosing said selected compressed digital video signal for display on said display apparatus.

17. A method as in claim 16, further comprising transmitting said signal from said user from a remote control device.

18. A method as in claim 15, further comprising receiving an output signal from said first processor at a third processor and converting with said third processor said output signal to an analog video output signal for display on said display apparatus.

19. A method as in claim 15, wherein said plurality of different transmission systems comprises a satellite television broadcasting system and a cable television broadcasting system.

20. A method as in claim 19, wherein said plurality of different transmission systems further comprises a terrestrial television broadcasting system.

21. A method as in claim 15, wherein said plurality of different transmission systems comprises a digital video playback system associated with said multimedia terminal.

22. A method as in claim 21, wherein at least one of said interfaces is adapted to receive digital video signals formatted in accordance with the IEEE 1394 standard and further comprising communicating with said digital video playback system through said one interface.

23. A method as in claim 15, wherein said plurality of different transmission systems comprises a digital video playback system associated with said multimedia terminal, said playback system being of a particular type, and further comprising identifying with said second processor said particular type and causing with said second processor said selected one of said decompression programs to be transmitted from said memory to said first processor on the basis of said type.

24. A method as in claim 15, wherein said differently compressed digital video signals include digital video signals compressed in accordance with the MPEG standard.

25. A method as in claim 24, wherein said differently compressed digital video signals include HTML data.

26. A method as in claim 15, wherein each of said differently compressed digital video signals is modulated on one of a plurality of different carriers and further comprising using said interfaces to demodulate said digital video signals from said carriers.

27. A method as in claim 15, wherein said differently compressed digital video signals are formatted in different image resolutions.

28. A method as in claim 15, wherein said memory is removably mounted on said multimedia terminal.

* * * * *

UNITED STATES PATENT AND TRADEMARK OFFICE
CERTIFICATE OF CORRECTION

| | | |
|---|---|---|
| PATENT NO. | : 6,985,189 B1 | Page 1 of 1 |
| APPLICATION NO. | : 09/277646 | |
| DATED | : January 10, 2006 | |
| INVENTOR(S) | : Shinji Takada and Hajime Inoue | |

It is certified that error appears in the above-identified patent and that said Letters Patent is hereby corrected as shown below:

On the title page, column 1, in the title, after the word "DIGITAL" insert the word --SIGNAL--.

Column 1, line 2, after the word "DIGITAL" insert the word --SIGNAL--.

Signed and Sealed this

Seventeenth Day of October, 2006

JON W. DUDAS
*Director of the United States Patent and Trademark Office*